US006586748B1

(12) United States Patent
Lloyd et al.

(10) Patent No.: US 6,586,748 B1
(45) Date of Patent: Jul. 1, 2003

(54) NON-INVASIVE WATER CURRENT MEASUREMENT SYSTEM AND METHOD

(75) Inventors: Jack Lloyd, Lynn Haven, FL (US); Lyles Adair, Panama City Beach, FL (US); William Stachnik, Voluntown, CT (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 480 days.

(21) Appl. No.: 09/588,641

(22) Filed: Jun. 6, 2000

(51) Int. Cl.[7] ................................................. G01C 3/08
(52) U.S. Cl. ............................ 250/455.11; 250/453.11; 250/454.11; 356/4.01; 356/28; 356/28.5; 356/5.01; 356/5.02; 356/5.03; 356/5.04; 356/5.05; 356/5.06; 356/5.07; 356/5.08; 356/5.09; 356/5.1; 356/5.11; 356/5.12; 356/5.13; 356/5.14; 356/5.15
(58) Field of Search ..................... 250/453.11, 454.11, 250/455.11, 302, 493.1; 356/4.01, 28, 28.5, 5.01, 5.02, 5.03, 5.04, 5.05, 5.06, 5.07, 5.08, 5.09, 5.1, 5.11, 5.12, 5.13, 5.14, 5.15

(56) References Cited

U.S. PATENT DOCUMENTS

| | | | | |
|---|---|---|---|---|
| 4,172,255 A | * | 10/1979 | Barrick et al. | 343/5 W |
| 4,996,533 A | * | 2/1991 | May et al. | 342/108 |
| 5,034,810 A | * | 7/1991 | Keeler | 358/95 |
| 5,381,222 A | * | 1/1995 | Palmer | 356/4 |
| 5,808,741 A | * | 9/1998 | Anderson | 356/360 |
| 5,822,047 A | * | 10/1998 | Contarino et al. | 356/5.01 |

* cited by examiner

Primary Examiner—John R. Lee
Assistant Examiner—David A. Vanore
(74) Attorney, Agent, or Firm—Harvey A. Gilbert; Donald G. Peck

(57) ABSTRACT

A method and system are provided for measuring water current direction and magnitude. A plurality of beams of radiation are transmitted radially outward from a location above a body of water. Each beam is incident on the water's surface at an angle with respect thereto. Each beam experiences a Doppler shift as a result of being incident on the water's surface such that a plurality of Doppler shifts are generated. Each Doppler shift is measured with the largest one thereof being indicative of water current direction and magnitude.

25 Claims, 2 Drawing Sheets

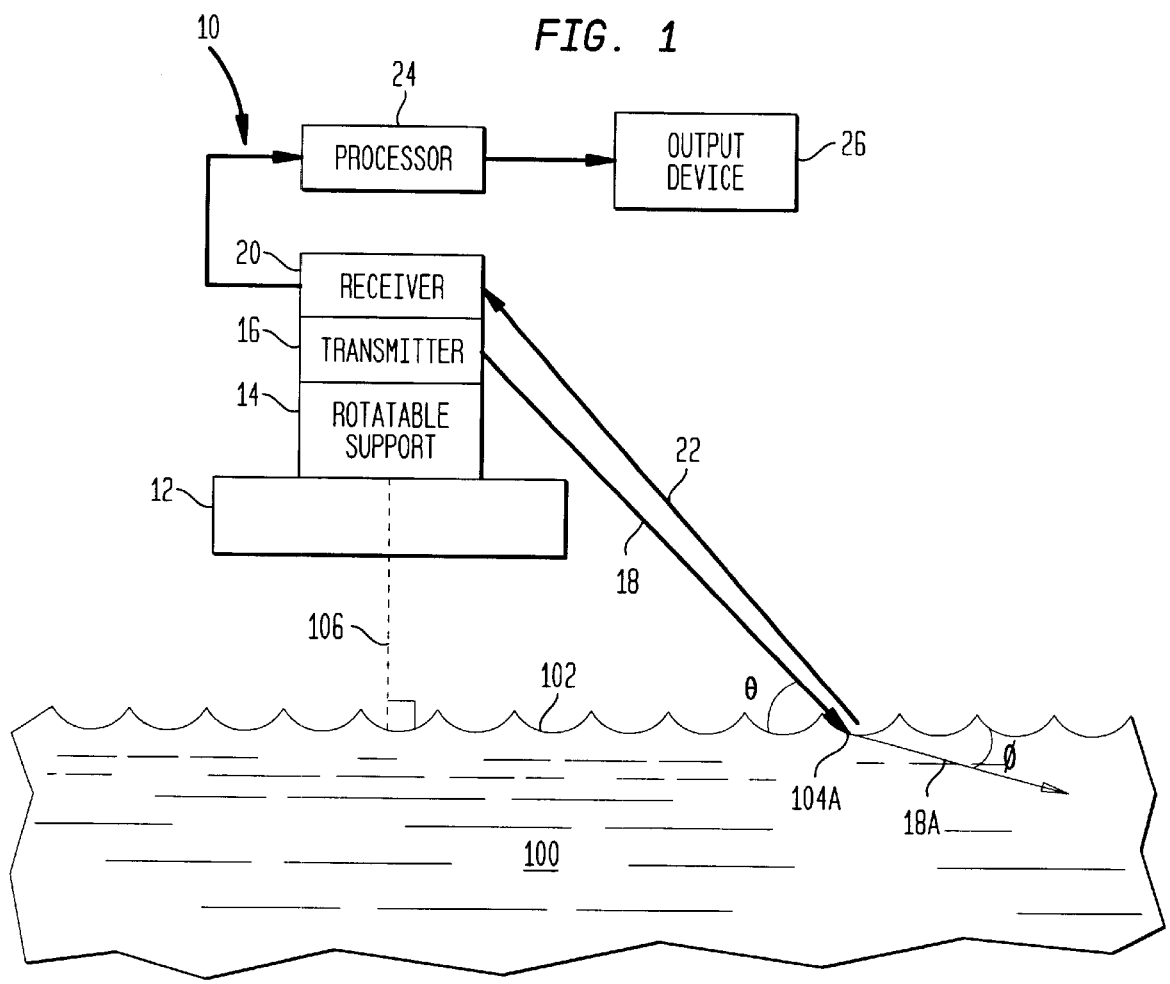
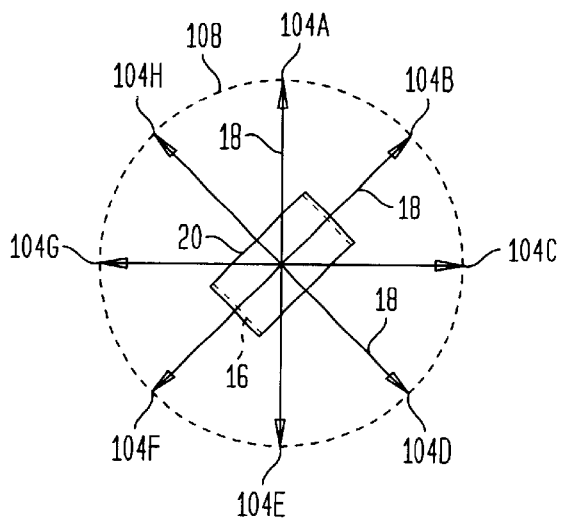

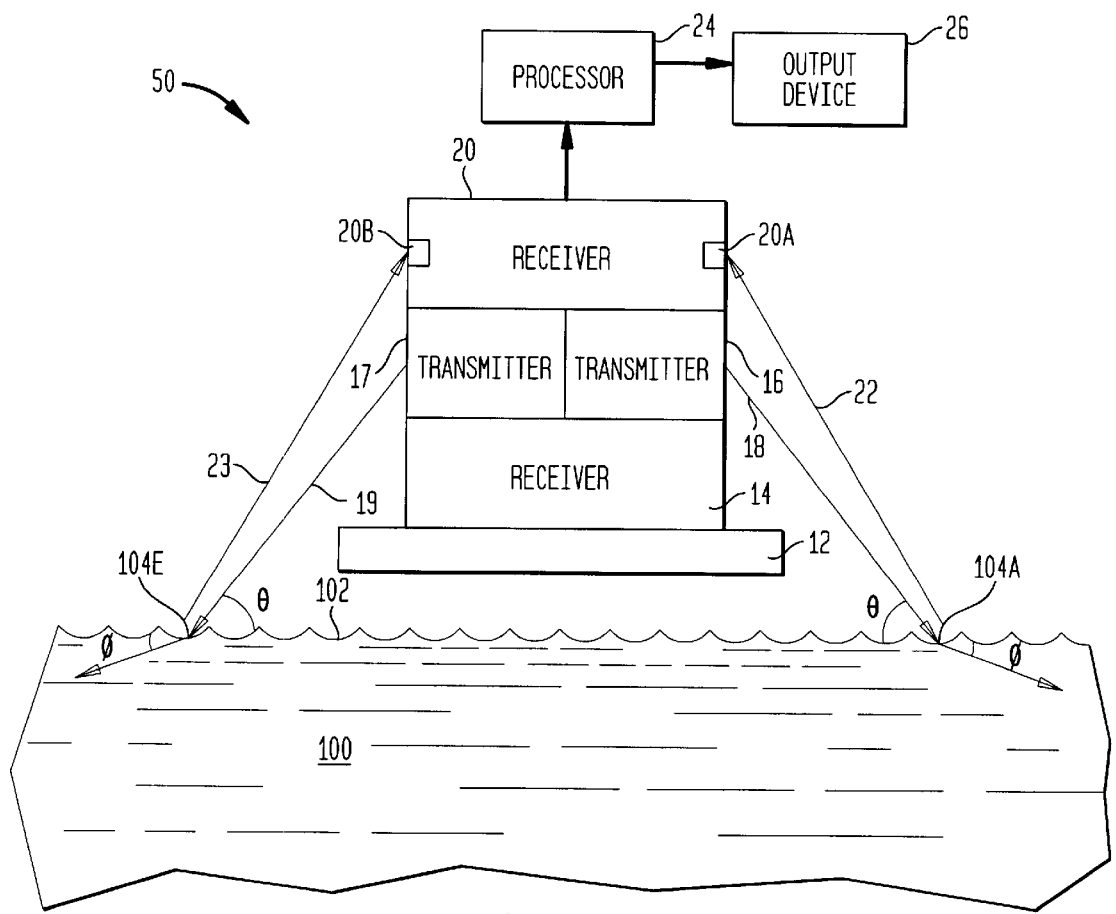
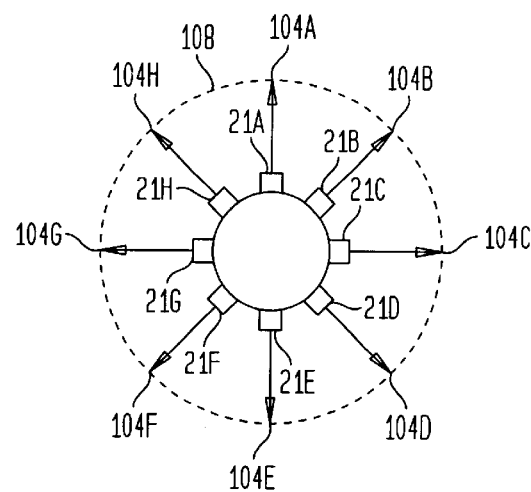

NON-INVASIVE WATER CURRENT MEASUREMENT SYSTEM AND METHOD

ORIGIN OF THE INVENTION

The invention described herein was made in the performance of official duties by employees of the Department of the Navy and may be manufactured, used, licensed by or for the Government for any governmental purpose without payment of any royalties thereon.

FIELD OF THE INVENTION

The invention relates generally to the measurement of water current, and more particularly to a method and system that provides for the non-invasive measurement of water current magnitude and direction.

BACKGROUND OF THE INVENTION

A variety of small unmanned underwater vehicles are in development and use today. In situations where precision navigation is critical (e.g., mine clearing activities carried out by torpedo-like vehicles), surface and/or underwater currents can affect navigation performance and, therefore, affect the outcome of a vehicle's mission. Accordingly, it would be beneficial to know what the surface and/or bulk underwater currents are prior to vehicle deployment in order to aid in selection of vehicle heading, speed, operating depth, etc. Ideally, measurement of surface and/or bulk underwater currents would be accomplished non-invasively (i.e., no measurement device need be placed in the water) from a remote location.

SUMMARY OF THE INVENTION

Accordingly, it is an object of the present invention to provide a method and system for measuring water currents in a body of water.

Another object of the present invention is to provide a non-invasive method and system for measuring water currents.

Still another object of the present invention is to provide a method and system for measuring surface and/or bulk underwater currents.

Yet another object of the present invention is to provide a method and system for remotely measuring surface and/or bulk underwater currents.

Other objects and advantages of the present invention will become more obvious hereinafter in the specification and drawings.

In accordance with the present invention, a method and system are provided for measuring water current direction and magnitude. A plurality of beams of radiation are transmitted radially outward from a location above a body of water. Each beam is incident on the water's surface at an angle with respect thereto. Each beam experiences a Doppler shift as a result of being incident on the water's surface such that a plurality of Doppler shifts are generated. Each Doppler shift is measured with the largest one thereof being indicative of water current direction and magnitude. For bulk underwater current measurements, the transmitted beams have a wavelength in the blue-green spectral region. For surface current, the transmitted beams have a wavelength outside the blue-green spectral region. If both surface and bulk underwater currents are to be measured, the transmitted beams can be multiple wavelength beams having wavelength components both within and outside of the blue-green spectral region.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein:

FIG. 1 is a schematic view of a system for carrying out a non-invasive measurement of surface and/or bulk underwater currents according to one embodiment of the present invention;

FIG. 2 is a schematic top view of the system illustrating a plurality of beams distributed evenly throughout 360° about their transmission location;

FIG. 3 is a schematic view of a system for carrying out the current measurement method according to another embodiment of the present invention in which a pair of radially opposed beams are used; and FIG. 4 is a schematic top view of another system for simultaneously transmitting the plurality of beams of radiation radially outward from the transmission location.

DETAILED DESCRIPTION OF THE INVENTION

Referring now to the drawings, and more particularly to FIG. 1, a system for carrying out a non-invasive measurement of surface and/or bulk underwater currents according to the present invention is shown and referenced generally by numeral 10. System 10 is typically mounted or deployed on a platform 12 (e.g., aircraft, surface ship, etc.) at some point above a body of water 100 (e.g., ocean, river, lake, etc.), the surface of which is indicated at 102. As is well known in the art of oceanography, "surface currents" refers to those currents occurring right at surface 102 or slightly below surface 102, i.e., extending down to a depth that is approximately equal to one wavelength of surface waves occurring at surface 102. The term "bulk underwater currents" refers to those currents in the water column beneath surface 102 and excludes the "surface currents".

Structurally, system 10 includes a platform 12 that supports thereon a rotatable support 14, a transmitter 16 for transmitting a beam 18 of radiation to be incident at a spot 104A on surface 102, and a receiver 20 for receiving a Doppler shifted return 22 attributable to beam 16. A processor 24 (located locally or remotely) will typically be coupled to receiver 20 for processing the output thereof. Processor 24 can also be coupled to rotatable support 14 for control thereof. An output device 26, e.g., display screen, printer, simulated voice device, etc., can be coupled to processor 24 to provide an output indicative of the current measurement.

Transmitter 16 can take a variety of forms. For example, if only the bulk underwater current is of concern, transmitter 16 can be realized by a single-mode laser having its output in the blue-green spectral region, i.e., beam 18 has a wavelength between 475–550 nanometers (nm). In this spectral region, beam 18 penetrates surface 102 to illuminate the water volume below spot 104A along a path 18A dictated by Snell's Law. More specifically, beam 18 is incident on surface 102 at an angle θ with respect thereto. When beam 18 is in the blue-green spectral region, the beam propagates under surface 102 along path 18A at an angle φ with respect to surface 102. As is known in the art, the angles θ and φ are related according to the following expression:

$$\phi = \text{Arc sin}((1/n)\sin\theta)$$

where n is the index of refraction for water.

The motion of the current under surface 102 induces a Doppler shift in the beam propagating along path 18A. This wavelength (or frequency) shift is detectable in light that is reflected and scattered back to receiver 20 as Doppler shifted return 22. Since the Doppler shift only reflects motion along the direction of beam 18, and the desired measurement is the horizontal component of the water current, beam 18 must be at a relatively large angle (typically 45–60°) with nadir, i.e., an imaginary vertical line 106 dropped from transmitter 16 and normal to surface 102. This makes angle θ typically in the range of approximately 30–45°.

If only surface current is of concern, transmitter 16 can be a single-mode laser having its output outside of the blue-green region, e.g., beam 18 could be a laser operating in the infrared region. As is known in the art, the optical transmission window for seawater ranges between approximately 350 nm and 850 nm. However, outside of the blue-green spectral region, transmissivity is poor. That is, if beam 18 is outside the blue-green spectral region, beam 18 does not sufficiently penetrate into water 100 for purposes of measuring bulk underwater current in accordance with the present invention. Accordingly, Doppler shifted return 22 in the case of a non-blue-green spectral region beam 18 is indicative of surface current.

Still further, if both surface and bulk underwater currents are of concern, transmitter 16 can be a multi-mode laser capable of producing a co-registered, multi-wavelength beam 18. For example, transmitter 16 could be a frequency-doubled Nd:YAG laser having both an infrared (i.e., 106 μm) and a blue-green (i.e., 532 nm) output co-registered on beam 18. In this instance, receiver 20 would be realized by detectors sensitive to Doppler shifted return 22 having both infrared and blue-green wavelength components.

Regardless, of the type of transmitter 16, system 10 will be operated in the following fashion. Transmitter 16 focuses beam 18 at spot 104A while receiver 20 is focused along the same line-of-sight as beam 18 for the detection of Doppler shifted return 22. To reduce the effect of waves (now shown) at surface 102, beam 18 is transmitted and Doppler shifted return 22 is accumulated over one or more complete wave cycle of the surface waves. The median value of Doppler shifted return(s) 22 could be used as the final measurement for spot 104A. In most large bodies of water, the time for a complete wave cycle ranges between approximately 3–10 seconds. However, in the Pacific Ocean, large and slow-moving surface waves can have a wave cycle of 40 seconds or more. In these instances, surface 102 can be considered to be flat at any given instant such that it would be sufficient for the measurement process to be carried out over a very short (less than one second) duration for a particular illuminated spot on the water.

Once the measurement cycle for spot 104A is complete, rotatable support 14 rotates the combination of transmitter 16/receiver 20 to a new position. For example, as best seen in the top view of FIG. 2, beam 18 is next trained on a spot 104B located an angular distance away from spot 104A at a new compass heading. That is, spot 104B is located on an imaginary circle 108 traced about the point of transmission/reception. Once the measurement cycle for spot 104B is complete, transmitter 16/receiver 20 is rotated parallel to surface 102 to illuminate a new spot 104C on circle 108. The process is repeated for a plurality of discrete spots distributed evenly on circle 108 until transmitter 16/receiver 20 has been rotated through 360° with measurements being taken at each discrete step. The number of discrete spots used for taking measurements can be as few as three (i.e., spaced 120° apart), or as many as required or as time permits.

The measurements can be stored and/or processed at processor 24. The largest of the Doppler shifted returns 22 is (are) indicative of the magnitude of the surface and/or bulk underwater current while the angular position or compass heading associated the largest Doppler shifted return is indicative of current direction. Interim results or just the final current magnitude and direction can be output to output device 26.

The amount of Doppler shift caused by a surface or bulk underwater current is very small, i.e., about one part in 582 million. While detectors/receivers sensitive to this amount of Doppler shift are known in the art, the present invention can be practiced in a way that would enhance the measurable amount of Doppler shift. The system/method for carrying this out will now be described with the aid of FIG. 3 where like reference numerals are used for those elements common with system 10 (FIG. 1). In FIG. 3, system 50 uses transmitter 16 as previously described and uses a second transmitter 17 to focus a second beam 19 simultaneously at a spot 104E that is 180° away from spot 104A. In other words, beam 18 and 19 are directed in radially opposing directions or compass headings. Note that a single transmitter 16 could also be used if optics (not shown) were provided to direct beams 18 and 19 in a radially opposed fashion as just described. Receiver 20 could have detectors 20A and 20B aligned with the line-of-sight of beams 18 and 19, respectively, in order to detect Doppler shifted returns 22 and 23, respectively. Receiver 20 (or processor 24) uses returns 22 and 23 in a heterodyne mode where the two returns are "beat" against each other to produce an output that is a direct determination of the Doppler shift. Since returns 22 and 23 are in radial opposition to one another, the signs of returns 22 and 23 are 180° out-of-phase so that the resulting heterodyned output is exactly twice the Doppler shift that would be indicated by either one of returns 22 or 23. In using system 50, it may be possible to just rotate transmitters 16/17 and receiver 20 through a circular arc of 180° in order to take measurements about a full 360°. Practically, however, system 50 is preferably rotated through a full 360° in order to account for various measurement asymmetries due to, for example, wind-generated surface waves.

Although the present invention has been described for systems/methods requiring rotations of a transmitter/receiver, this need not be the case. For example, as illustrated in FIG. 4, a plurality of transmitter/receiver combinations 21A–21H could be used to simultaneously illuminate spots 104A–104H, respectively, on circle 108 and simultaneously measure the associated Doppler shift returns (not shown in FIG. 4 for clarity of illustration). While such a configuration is more costly, it will be able to more quickly determine current magnitude and direction.

The advantages of the present invention are numerous. Non-invasive water current measurements can now be made. Systems embodying the method of the present invention can be constructed using a variety of off-the-shelf components. The present invention can provide surface current measurements, bulk underwater current measurements, or both.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A method for measuring water current direction and magnitude, comprising the steps of:

transmitting a plurality of beams of radiation radially outward from a location above a body of water, each of said plurality of beams being incident on the water's surface at an angle with respect thereto, wherein each of said plurality of beams experiences a Doppler shift as a result of being incident on the water's surface such that a plurality of Doppler shifts are generated; and measuring each of said plurality of Doppler shifts at said location wherein a largest one of said plurality of Doppler shifts is indicative of water current direction and magnitude.

2. A method according to claim 1 wherein said steps of transmitting and measuring are carried out for each of said plurality of beams one at a time.

3. A method according to claim 1 wherein said step of transmitting is carried out simultaneously for more than one of said plurality of beams.

4. A method according to claim 1 wherein said step of transmitting is carried out simultaneously for radially opposed ones of said plurality of beams.

5. A method according to claim 1 wherein said angle is in the range of approximately 30–45°.

6. A method according to claim 1 wherein each of said plurality of beams has a wavelength in the blue-green spectral region.

7. A method according to claim 1 wherein each of said plurality of beams has a wavelength outside of the blue-green spectral region.

8. A method according to claim 1 wherein each of said plurality of beams has multiple wavelengths with one of said multiple wavelengths being a wavelength in the blue-green spectral region.

9. A method according to claim 1 wherein said plurality of beams are distributed evenly throughout a 360° circular arc about said location.

10. A method according to claim 1 wherein said steps of transmitting and measuring are carried out for approximately one wave cycle of the body of water for each of said plurality of beams.

11. A method for measuring water current direction and magnitude, comprising the steps of:

providing means for transmitting at least one beam of radiation from a location above a body of water to be incident on the water's surface at an angle thereto, and for measuring a corresponding at least one Doppler shift attributable to said at least one beam incident on the water's surface; and rotating said means through a circular arc about said location in a plurality of discrete steps, said circular arc being parallel to the water's surface, each of said plurality of discrete steps being indicative of a compass heading of said at least one beam, wherein current magnitude is indicated by a largest Doppler shift of said at least one Doppler shift and wherein current direction is indicated by said compass heading of said at least one beam associated with said largest Doppler shift.

12. A method according to claim 11 wherein said at least one beam comprises a pair of radially opposed beams.

13. A method according to claim 11 wherein said angle is in the range of approximately 30–45°.

14. A method according to claim 11 wherein said at least one beam has a wavelength in the blue-green spectral region.

15. A method according to claim 11 wherein said at least one beam has a wavelength outside of the blue-green spectral region.

16. A method according to claim 11 wherein said at least one beam comprises a co-registered beam having multiple wavelengths with one of said multiple wavelengths having a wavelength in the blue-green spectral region.

17. A method according to claim 11 wherein said plurality of discrete steps are distributed evenly throughout said circular arc.

18. A method according to claim 11 wherein said step of rotating includes the step of delaying movement along said circular arc to a next of said plurality of discrete steps for a period of approximately one wave cycle of the body of water.

19. A system for measuring water current direction and magnitude, comprising:

means for transmitting each of a plurality of beams of radiation radially outward from a location above a body of water to be incident on the water's surface at an angle with respect thereto, wherein each of said plurality of beams experiences a Doppler shift as a result of being incident on the water's surface such that a plurality of Doppler shifts are generated; and means for measuring each of said plurality of Doppler shifts at said location wherein a largest one of said plurality of Doppler shifts is indicative of water current direction and magnitude.

20. A system as in claim 19 wherein said means for transmitting comprises:

a transmitter for transmitting a single beam of radiation; and means coupled to said transmitter for rotating said transmitter through 360° about said location parallel to the water's surface in a plurality of discrete steps, each of said plurality of discrete steps being indicative of a compass heading, wherein said plurality of beams are transmitted after said transmitter is rotated through 360°.

21. A system as in claim 19 wherein said means for transmitting comprises:

a transmitter for transmitting a pair of radially opposed beams of radiation; and means coupled to said transmitter for rotating said transmitter through at least 180° about said location parallel to the water's surface and in a plurality of discrete steps, each of said plurality of discrete steps being indicative of a compass heading, wherein said plurality of beams are transmitted after said transmitter is rotated through at least 180°.

22. A system as in claim 19 wherein said means for transmitting includes a laser operating in the blue-green spectral region.

23. A system as in claim 19 wherein said means for transmitting includes a laser operating outside the blue-green spectral region.

24. A system as in claim 19 wherein said means for transmitting includes a laser producing a beam having multiple wavelengths with one of said multiple wavelengths being a wavelength in the blue-green spectral region.

25. A system as in claim 19 wherein said angle is the same for each of said plurality of beams and is approximately in the range of 30–45°.

* * * * *